United States Patent [19]
Visscher

[11] 3,931,562
[45] Jan. 6, 1976

[54] ELECTRIC DRIVING ARRANGEMENT USING A STEPPING MOTOR

[75] Inventor: Johannes Mattheus Visscher, Eindhoven, Netherlands

[73] Assignee: U.S. Philips Corporation, New York, N.Y.

[22] Filed: July 23, 1974

[21] Appl. No.: 491,162

Related U.S. Application Data

[63] Continuation of Ser. No. 856,672, Sept. 10, 1969, abandoned.

[30] Foreign Application Priority Data
Sept. 14, 1968 Netherlands .................... 6813189

[52] U.S. Cl. ............................ 318/685; 318/254
[51] Int. Cl.² ........................................ G05B 19/40
[58] Field of Search .......... 318/685, 696, 341, 138, 318/254

[56] References Cited
UNITED STATES PATENTS

| | | | |
|---|---|---|---|
| 3,328,658 | 6/1967 | Thompson | 318/696 |
| 3,374,410 | 3/1968 | Cronquist et al. | 318/685 |
| 3,435,314 | 3/1969 | Bradley et al. | 318/685 |

*Primary Examiner*—G. R. Simmons
*Attorney, Agent, or Firm*—Frank R. Trifari; Bernard Franzblau

[57] ABSTRACT

A control circuit for a step motor includes means for stepping the motor at a speed at which it can not be reliably stopped at a given step. The control circuit also includes a motor deceleration circuit that includes a bistable device, a pulse delay circuit with a given delay time and controlled by the bistable device, and a gating circuit all of which cooperate to decelerate the motor by supplying stepping pulses to the motor stator windings with a one step delay.

9 Claims, 1 Drawing Figure

U.S. Patent  Jan. 6, 1976  3,931,562
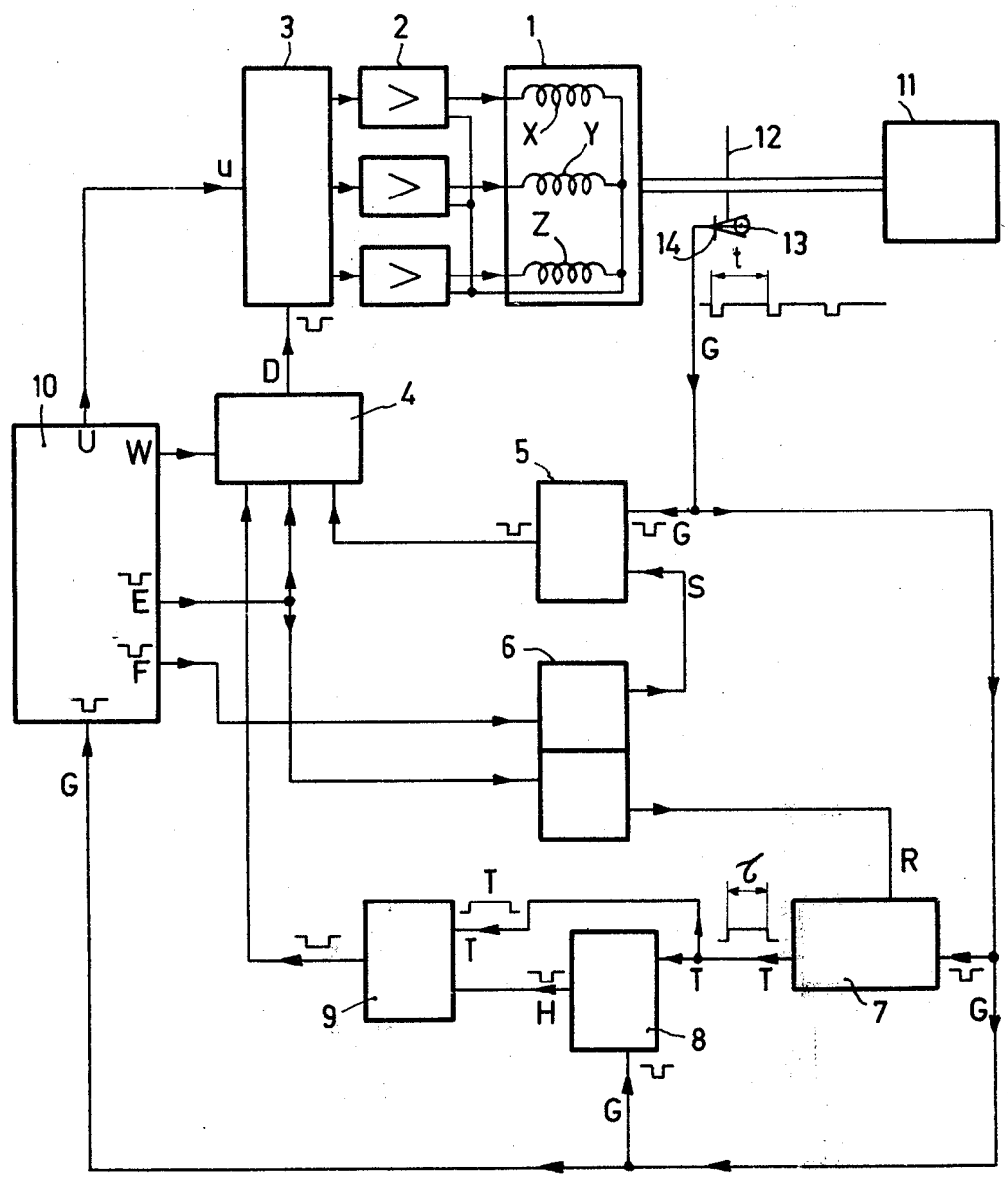
INVENTOR.
JOHANNES M. VISSCHER
BY
AGENT

ELECTRIC DRIVING ARRANGEMENT USING A STEPPING MOTOR

This application is a continuation of application Ser. No. 856,672, filed Sept. 10, 1969, and now abandoned.

The invention relates to an electric driving arrangement including a stepping motor having at least three stator windings or winding parts energized by a corresponding number of amplifiers which are controlled by a ring counter having a corresponding number of positions. The stepping motor drives a member which at each step generates a step measuring pulse which is fed back to the ring counter in a manner such that after a first starting pulse has been applied to the ring counter the stepping motor is accelerated in an optimum manner and attains a speed at which it can no longer be stopped within one step with certainty.

Such a device is known from U.S. Pat. No. 3,374,410 in the name of Cronquist et al., Mar. 19, 1968. In this device the stepping motor is braked in an optimum manner by initiating the energizing cycle for the opposite direction of rotation. This technique requires that special means must be used to prevent the motor from stepping back immediately before reaching the desired stopping position. Hence the entire arrangement becomes comparatively complicated and expensive.

It is an object of the invention to provide a driving arrangement of the type defined in the first paragraph in which optimum deceleration of the stepping motor is effected in a simpler and cheaper manner, especially in respect of the final and stopping stage of the deceleration.

The device according to the invention is characterized in that it further includes: a bistable switch which responds to the starting pulse to be moved to a running position in which it allows the transmission of the step measuring pulses to the ring counter, a pulse delay circuit having a minimum delay time which is slightly shorter than the time interval between two successive step measuring pulses at a given deceleration speed of the stepping motor at which it can be stopped within a given step with certainty. The delay circuit is rendered inoperative by the bistable switch in the said running position and is rendered operative in the other position of this switch, i.e. the deceleration-stop position, and each time is reset to an operative position by the step measuring pulses. The device further includes a gate circuit controlled by the pulse delay circuit in a manner such that it transmits the step measuring pulse to the ring counter in the operative condition of this circuit so that the stepping motor is decelerated to the chosen decelerating speed in an optimum manner by the current pulses which, after the bistable switch has been switched to its deceleration position, are applied to the stator windings with a delay of one step.

In this arrangement the stepping motor is decelerated by introducing at the instant of deceleration a fixed phase shift of the energizing cycle, the value of this shift being chosen so that the motor assumes a stepping speed at which it can be stopped within one step. Depending upon the load variations to be expected the instant of deceleration is chosen so that the motor has been decelerated to the desired final stepping speed exactly one or a few steps short of the desired stop position.

The invention will now be described more fully with reference to the accompanying drawing the single FIGURE of which shows an embodiment of the driving arrangement according to the invention in block schematic form.

The electric driving arrangement shown comprises a stepping motor 1 having three windings X, Y and Z energized by a corresponding number of amplifiers 2 which are controlled by a ring counter 3 which has the same number of positions and which together with the amplifiers 2 forms a commutation device for the motor 1. The amplifiers 2 may alternatively be included in the ring counter 3 and, for example, in the case of a ring counter having four positions, each amplifier may energize one half of a centre-tapped winding.

The motor 1 drives a load 11 and also a movable member 12 of a step measuring pulse generator. As is shown in the FIGURE the member 12 may be an apertured disc mounted for rotation between a source of light 13 and a photocell 14, a step measuring pulse G being generated at each step taken by the motor 1.

The step measuring pulses G are fed back as counting pulses D to the ring counter 3 so as to advance it one position at each step. This is effected by way of pulse gates 4 and 5 so that the step measuring pulse transfer is made to depend on several conditions.

The step measuring pulses G are also applied to a control member 10 in which they are counted and compared with the number of steps the stepping motor 1 has to travel. For the sake of convenience, various conventional control functions have been grouped together in control box 10. Apparatus suitable for counting and comparing and for generating a deceleration pulse F followed by a stop pulse W are shown in U.S. Pat. Nos. 3,435,314 (Bradley et al., Mar. 25, 1969), 3,328,658 (Thompson, June 27, 1967) and the above cited Cronquist patent. For example, the Bradley patent shows a counter preloaded with a count equal to the number of increments (steps) through which his motor is to be incremented. Step pulses synchronized to the motor shaft rotation are fed back to the counter input. When the number of steps counted equals the preloaded count in the counter, the counter produces a stop signal at a terminal labelled 0, which is used to signal the system to stop the motor. A number of steps before the desired stop point, depending on the motor speed, Bradley's counter generates a deceleration pulse which is passed by a given AND gate, determined by the motor speed, to signal the system to decelerate or slow the motor to a speed at which it can stop without any overshoot. The AND gate to be energized can be set to match the inertia of the load 11. A similar counter arrangement can be used in my control box 10, preloaded to a desired count and stepped along by step pulses G. The counter outputs for generating the deceleration pulse F could be gated by a plurality of AND gates as shown in Bradley, or alternatively by means of a multiposition switch preset as a function of the load inertia to start the deceleration cycle at a time sufficient to slow the motor to the desired final stepping speed within one or a few steps short of the desired stop position. The use of a multiposition switch to select a given output of a counter is described in U.S. Pat. Nos. 3,448,251 and 3,568,070.

The control member 10 is designed so that when the driving arrangement is started it will, under the control of a starting command applied to it, generate a starting pulse E which is applied to the pulse gate 4 and through this to the ring counter 3 as a first counting pulse. The control member is further designed so as to close the pulse gate 4 when a stopping condition W has been satisfied in that the number of received step measuring pulses G has become equal to the chosen number of steps to be taken by the motor 1. The start pulse E may be generated by any one of a number of conventional circuits, e.g., by means of a one-shot multivibrator (not shown) controlled by one output of a Flip-Flop (not shown). One input ("set" input) of the Flip-Flop may be controlled by a manual switch to set the Flip-Flop and thereby energize the one-shot multivibrator. The output of the one-shot MV is then connected to terminal E of control box 10. The stop condition W is generated by the counter (not shown) when the number of input pulses G applied thereto equals a preloaded count set into the counter and equal to the chosen number of steps to be taken by the motor. This can be conveniently implemented by connecting the counter output to the "reset" input of the aforesaid Flip-Flop and connecting terminal W of control box 10 directly to said one output of the Flip-Flop.

By means of the device so far described the motor 1 is accelerated in an optimum manner by feedback through the pulse gates 5 and 4, assuming the gate 5 to be always open. Gate 5 may conveniently be a conventional coincidence or AND gate, examples of which are well known in the art. For example, see U.S. Pat. Nos. 3,422,254, 2,951,951, 3,515,900 and 3,180,977. The motor speed quickly reaches a value at which the motor together with the load 11 mechanically connected to it can no longer be stopped within a single step with certainty and under certain conditions this speed increases until it attains a limit value which depends on the switching time of the stator windings X, Y and Z of the motor 1 and on its load 11, especially on the total inertia of the rotating parts and on the friction.

If under these conditions the stopping condition W is suddenly satisfied in that the number of counted step measuring pulses G becomes equal to the chosen number of steps to be travelled, the control member 10 transmits the stopping condition W and the pulse gate 4 is closed, but the motor 1 together with its load 11 travels on one or more steps owing to the inertia of the moving parts.

In order to prevent such an overshoot the device further includes:

1. A bistable switch 6 which by the starting pulse E from the control member 10 is set to a running state in which it allows the transmission of the step measuring pulses G to the pulse gate 4 and the ring counter 3 through the AND gate 5, by a transmission condition S being fulfilled. This bistable switch 6 is set to its other state (deceleration state) by a deceleration pulse F from the counter (not shown) of the control member 10. In this deceleration state a deceleration condition R is satisfied.

2. A pulse delay circuit 7 having a minimum delay time $\tau$ which is slightly smaller than the time interval $t$ between two successive step measuring pulses G at a chosen deceleration speed of the stepping motor 1 at which it can be stopped with certainty within a single step. This pulse delay circuit 7 is cut off by the bistable switch 6 in its running state and is rendered conductive by the deceleration condition R being satisfied in the other state of the switch, i.e. its deceleration and stop state. In this conductive state the delay circuit is reset to an operative state by each of the step measuring pulses G, in which state it transmits a transmission condition T. As long as the delay time $\tau$ exceeds the time interval $t$ between two successive step measuring pulses G, the transmission condition T will always remain satisfied in the deceleration and stop state of the pulse delay circuit 7.

3. A pulse gate 8 to which the step measuring pulses G are applied and which is controlled by the output of the pulse delay circuit 7 so that, when the condition T is satisfied, it transfers the step measuring pulses G as output pulses H. Gate 8 also may be a conventional AND gate similar to gate 5 and well known in the art.

4. An or-gate 9 to which the output pulses H of the pulse gate 8 and the output of the pulse delay circuit 7 are applied and which transmits the pulses H or the trailing edge of the transmission condition T to the pulse gate 4.

Thus, the pulse gate circuit 4 transmits to the ring counter 3 as counting pulses D: first the start pulse E from the control member 10, then the step measuring pulses G from the pulse gate 5 and finally the "delayed" step measuring pulses H from the or-gate 9, until the pulse gate 4 is closed by the control member 10 when the stopping condition W is satisfied. Gate circuit 4 may comprise any conventional logic circuit that satisfies the Boolean functional requirement thereof, i.e. $D = (E+G+H)(\bar{W})$, for example a conventional 3-input OR gate with the 3 inputs connected respectively to the E terminal of control member 10, the output of gate 5 and the output of OR gate 9. Gate 4 may further include an AND gate with one input connected to the output of said 3-input OR gate and a second input connected to the stop terminal W of control member 10 via an inverter. The output of the latter AND gate supplies the step pulses D to the ring counter 3. One form of logic circuit of the type described is shown on page 312 of the textbook *Digital Computer and Control Engineering* by R. S. Ledley (McGraw Hill – 1960). Other conventional logic circuits also may be used to provide the functions of gate circuit 4 since each Boolean function may be expressed in its variables in an infinite number of equivalent ways.

When the control member 10 receives a start instruction (forwards or backwards) it generates a start pulse E which is transmitted to the ring counter 3 through the pulse gate 4 and to the bistable switch 6 and sets the latter to its running state (satisfying the condition S). Simultaneously the control member 10 transmits a directional condition U to the ring counter 3 so that the counter commences counting in the desired direction. Apparatus for driving a step motor in either a clockwise or counter-clockwise direction by means of a reversible ring counter in combination with a diode gating arrangement is described at pages 271–274 of the 1968 edition of *The Digital Logic Handbook Flip Chip Modules* by the Digital Equipment Corp., Maynard, Mass. (1968). Also see U.S. Pat. Nos. 3,487,381, 3,345,547, 3,386,018, 3,359,474, 3,374,410 and 3,324,467.

By means of the start pulse E the ring counter is advanced one position, for example, from X to Y, while the bistable switch 6 cuts off the pulse delay circuit 7 and opens the pulse gate 5. The stepping motor 1 now is accelerated from the stationary position associated with energisation of the winding X to the next position associated with energisation of the winding Y. When it reaches this next position the step measuring pulse generator 12, 13, 14 generates a first step measuring pulse G which reaches the ring counter through the pulse gates 5 and 4. As a result, the ring counter is advanced from Y to Z so that the motor 1 is immediately accelerated to the position associated with energisation of the winding Z, and so on.

Thus, the motor runs in an optimum manner to the highest possible stepping rate, as has been described hereinbefore. As a rule, after even a few steps the stepping rate has increased to a value such that the motor 1 together with its load can no longer be stopped within a single step with certainty. The arrangement described then ensures optimum deceleration without the likelihood of errors.

A certain number of steps before the motor 1 has reached the desired new position the control member 10 generates a deceleration pulse F. The said number of steps can be set in the control member 10, for example, so as to match a changed load 11 (increased or decreased total inertia). This deceleration pulse switches the bistable switch 6 to its deceleration state in which it closes the pulse gate 5 and renders the pulse delay circuit 7 conductive. The delay time $\tau$ of this circuit now is much greater than the time interval $t$ between two successive step measuring pulses G, because the motor 1 runs at a comparatively high stepping rate. If, for example, the deceleration pulse F has been generated after the passage through zero from the position associated with energisation of the winding X (position X) to the position Y associated with the energisation of the winding Y, the next step measuring pulse G associated with the position Y is no longer transmitted to the ring counter 3 because the pulse gate 5 now is closed, but it sets the conductive pulse delay circuit 7 to its operative state in which the condition T is satisfied.

Consequently, the ring counter 3 remains in its position Y and the motor 1 is decelerated to a maximum extent during its travel from Y to Z because its winding Y remains energized. Since the time delay $\tau$ is greater than the time interval $t_{yz}$ between the step measuring pulses $G_y$ and $G_z$ corresponding to the positions Y and Z, the condition T remains satisfied and the pulse gate 8 passes the next step measuring pulse $G_z$ corresponding to the position Z. Hence a corresponding pulse $H_z$ is passed as counting pulse D through the or-gate 9 and the pulse gate 4 to the ring counter 3. The motor 1 which is travelling from its position Z to its position X consequently is again decelerated as rapidly as possible owing to the energisation of its winding Z by the ring counter 3. The step measuring pulse $G_z$ also causes the pulse delay circuit 7 to be reset to its operative state so that the beginning of the delay time $\tau$ again coincides with the step measuring pulse $G_z$ and the deceleration process can be repeated at the next step measuring pulse $G_x$. Thus, as long as $\tau$ remains greater than $t_{xy}$, $t_{yz}$ or $t_{zx}$, the motor 1 is decelerated to a maximum degree because it is effectively held or retained in the preceding position.

When the motor 1 has been decelerated to a degree such that the time between two successive step measuring pulses G (for example, $t_{xy}$) first becomes greater than $\tau$, the ring counter 3 on receiving the counting pulses $D_x$ corresponding to the step measuring pulse $G_x$ is again set to its position X and the delay time $\tau$ commences again while the motor 1 runs on from its position X to its position Y. However, $\tau$ terminates before the next step measuring pulse $G_y$ appears and the descending trailing edge of the condition T is passed in the form of a counting pulse $D_y$ delayed by a time $\tau$ to the ring counter 3 through the or-gate 9, which only passes negative going edges, and the pulse gate 4. As a result, the ring counter 3 is advanced to its position Y just before the step measuring pulse $G_y$ appears. The motor now is effectively drawn into its position Y. Since the condition T is no longer satisfied, the step measuring pulse $G_y$ can only reset the pulse delay circuit 7 to its operative state, in which this condition is again satisfied, but this pulse is not passed by the pulse gate 8. During the travel of the motor 1 from its position Y to its position Z the energizing winding Z is energized only after a time delay $\tau$, and so on. Consequently, the motor 1 assumes a deceleration speed which depends only on the delay time $\tau$, but it cannot step back because always the winding corresponding to the next position is in turn energized, be it only after a delay $\tau$.

This deceleration or final speed must be attained a few steps or at least one step before the desired stop position is reached. The control number 10, which directly receives all the step measuring pulses G, then can stop the ring counter 3 by closing the pulse gate 4 when the desired stop position is reached, by satisfying the stop condititon W. Thus, the motor 1 stops in the position corresponding to the final or stop state of the ring counter 3 because its speed now is equal to a deceleration speed at which it can be stopped within a single step.

By means of the above-described comparatively simple arrangement, which mainly consists of a small number of logic units, a stepping motor having at least three stator windings or winding parts is accelerated and decelerated in a really optimum manner, i.e. in the shortest possible time and with the minimum number of acceleration and deceleration steps.

What is claimed is:

1. An electric controller for a stepping motor having at least three stator windings or winding parts comprising, means for energizing said windings that includes a ring counter having an equal number of positions, means for applying a first starting pulse to the counter, the stepping motor driving a member which at each step generates a step measuring pulse, feedback means for coupling said pulse back to the input of the ring counter in a manner such that after said first starting pulse has been applied to the ring counter the stepping motor is accelerated by the step pulses in an optimum manner and attains a speed at which it can no longer be stopped with certainty within a single step, a bistable switch connected to control the pulse transmission path through the feedback means, means for applying the start pulse to the bistable switch to set same to a running state in which it allows the transmission of the step measuring pulses to the ring counter, means for actuating said bistable switch to a second deceleration state, a pulse delay circuit coupled to said pulse generating member, said delay circuit having a minimum delay time which is slightly smaller than the time interval between two successive step measuring pulses at a chosen deceleration speed of the stepping motor at which it can be stopped with certainty within a single step, means for coupling the bistable switch to the delay circuit so that the delay circuit is cut off by the bistable switch in said running state and is actuated in the deceleration state of the switch so as to be reset to an operative state by each of the step measuring pulses, and a gate circuit connected to receive said step pulses and controlled by the pulse delay circuit in a manner such that the gate circuit, in the operative state of the delay circuit, allows the step measuring pulses to pass to the ring counter so that the ring counter energizes the stator windings with a one step delay whereby the stepping motor is decelerated to the chosen deceleration speed in an optimum manner.

2. A controller as claimed in claim 1, characterized in that the pulse delay circuit is designed so that it is reset to its operative state by the trailing edges of the step measuring pulses.

3. A controller as claimed in claim 1 characterized in that it further includes an or-gate through which the trailing edge of the output signal of the pulse delay circuit is passed to the ring counter in the form of a pulse of the same polarity as the step measuring pulses so that the stepping motor runs on at the chosen deceleration speed until the supply of further pulses to the ring counter is interrupted, and means for interrupting the pulses supplied to the ring counter.

4. An electric controller for a step motor having a plurality of stator windings comprising, means for producing driving pulses coupled to said stator windings to energize same in sequence, a pulse generator operated in synchronism with the motor shaft to produce step pulses as the motor is stepped along, a first feedback transmission circuit for coupling the step pulses to the input of said pulse producing means to trigger same, control means for generating a start pulse and subsequently a deceleration pulse, means for supplying the start pulse to said pulse producing means, a second feedback transmission circuit coupled between the output of the pulse generator and the input of the pulse producing means, a bistable switch coupled to said control means to receive said start pulse and subsequently the deceleration pulse whereby the switch is operated into first and second states, respectively, means for coupling said bistable switch to said first and second feedback circuits so as to control the transmission of pulses therein, said first and second feedback circuits being open and closed, respectively, in the first state of the switch and being closed and open, respectively, in the second state of the switch, and said second feedback circuit includes a pulse delay circuit having a delay time which is greater than the time interval between step pulses when the motor is driven at its normal operating speed whereby the step pulses are passed to the pulse producing means with one step delay when the switch is in the second state.

5. A controller as claimed in claim 4 wherein said second feedback transmission circuit further comprises, a first gating means connected between the output of the delay circuit and the input of the pulse producing means, and means for coupling the output of the pulse generator to an input of said first gating means.

6. A controller as claimed in claim 5 wherein said second feedback transmission circuit further comprises second gating means having a first input directly coupled to the output of the delay circuit, a second input coupled to the output of the first gating means, and an output coupled to the input of the pulse producing means for supplying said delayed step pulse thereto.

7. A controller as claimed in claim 4 further comprising a gate circuit having a first input coupled to the output of the first feedback circuit, a second input coupled to the output of the second feedback circuit, a third input coupled to the control means to receive the start pulse, and an output coupled to the input of the pulse producing means to selectively apply thereto the start pulse, undelayed step pulses and delayed step pulses.

8. A controller as claimed in claim 7 wherein said control means includes means for supplying a stop pulse to a fourth input of said gate circuit to close same at the desired step position of the motor.

9. A controller as claimed in claim 4 wherein said control means includes, a counter for storing a count corresponding to the desired number of steps of the motor, means for supplying a stop pulse to the pulse producing means when the motor has been stepped the desired number of steps, and means for coupling the step pulses to an input of said control means to provide an indication of the step position of the motor.

* * * * *